United States Patent [19]

Clausen et al.

[11] 4,454,550

[45] Jun. 12, 1984

[54] CLEANING CARTRIDGE ASSEMBLY FOR A CASSETTE CLEANER

[75] Inventors: Eivind Clausen; James D. Allsop, both of Bellingham, Wash.

[73] Assignee: Allsop, Inc., Bellingham, Wash.

[21] Appl. No.: 337,768

[22] Filed: Jan. 7, 1982

[51] Int. Cl.³ .................... G11B 5/10; G11B 5/41; A47K 7/02; A47L 1/06

[52] U.S. Cl. .................... 360/137; 15/210 R; 360/128

[58] Field of Search ............. 360/93, 128, 132, 135, 360/137; 369/289; 15/32, 100, 210 R

[56] References Cited

U.S. PATENT DOCUMENTS

| | | | |
|---|---|---|---|
| 3,810,230 | 5/1974 | Orlowski | 360/128 |
| 3,955,214 | 5/1976 | Post | 15/210 R |
| 4,065,801 | 12/1977 | Leaming | 360/137 |
| 4,141,053 | 2/1979 | Kara | 360/137 |
| 4,225,893 | 9/1980 | Loiselle | 360/128 |
| 4,272,796 | 6/1981 | Van Kreuningen | 360/137 |

Primary Examiner—Robert M. Kilgore
Attorney, Agent, or Firm—Hughes, Barnard & Cassidy

[57] ABSTRACT

A cartridge having a housing removably mounted in a cleaning cassette. The housing has a first pivotal connecting member to pivotally engage a matching connecting means in the structure, and a second connecting member adapted to engage second connecting means in the structure to prevent rotation of the housing. There is a fixed pad mounting member in the housing and a second pad mounting head movably mounted on spring arm.

7 Claims, 4 Drawing Figures

CLEANING CARTRIDGE ASSEMBLY FOR A CASSETTE CLEANER

BACKGROUND OF THE INVENTION

The present invention relates generally to cassette cleaners for player and/or recording units, and more particularly to a device for cleaning a capstan and pinch roller of such units.

To clean the capstan and pinch roller of a playing/recording unit, the prior art discloses devices which hold one or more cleaning pads to engage the capstan and pinch roller. It is desirable that such cleaning pad or pads be held securely in the cleaning position, and yet it is desirable that the cleaning pad or pads be replaced periodically after performing a number of cleaning operations.

Accordingly, it is an object of the present invention to provide a cleaning assembly which is removably mounted in the cassette cleaner to provide a secure mounting for the cleaning pad or pads, and yet which can be conveniently removed and replaced.

SUMMARY OF THE INVENTION

The cleaning assembly of the present invention is adapted to be removably mounted in a cleaning position in the structure of a cleaning apparatus so as to be positioned so as to clean a capstan and pinch roller of a player and/or recording unit. The assembly comprises a housing having a forward portion, a rear portion, a first side portion and a second side portion.

The housing has at the first side portion, a first connecting member adapted to engage a matching connecting means of the structure in pivoting relationship at a pivot connecting location. The housing has at its second side portion a second connecting member adapted to engage a second connecting means of the structure when the housing is mounted in the structure in the cleaning position so as to inhibit rotation of the housing about the pivot connecting location.

There is a first pad mounting member fixedly mounted in the housing and defining a first forwardly extending recess to receive a first cleaning pad in a first pad cleaning position. There is a second pad mounting member comprising a spring arm having a first anchor end held stationary in the housing and a second movable end. There is a pad mounting head connected to the second movable end of the spring and providing a second forwardly extending recess to receive a second cleaning pad in a second movable pad cleaning position.

In the preferred form, the first side portion of the housing is formed with an interior slot means to receive the anchor end of the spring arm, with the spring arm extending toward the second side portion of the housing at a location rearwardly of the first mounting member. The spring arm is formed with an enlargement which fits in an enlarged portion of the slot means in the housing. Specifically, the enlarged portion of the slot means is positioned within the first connecting member.

In its non-operating position, the spring arm bears against the first mounting member to limit movement of the mounting head in a forward direction, while permitting rearward movement of the mounting head upon engagement with the pinch roller. So that the housing can be easily moved from its cleaning position in the structure, the second side portion of the housing has at its foward end a laterally extending lip adapted to be grasped to cause rotation of the housing about the first connecting member.

Other features of the present invention will become apparent from the following detailed description.

DESCRIPTION OF THE PREFERRED EMBODIMENT

Figure 1:
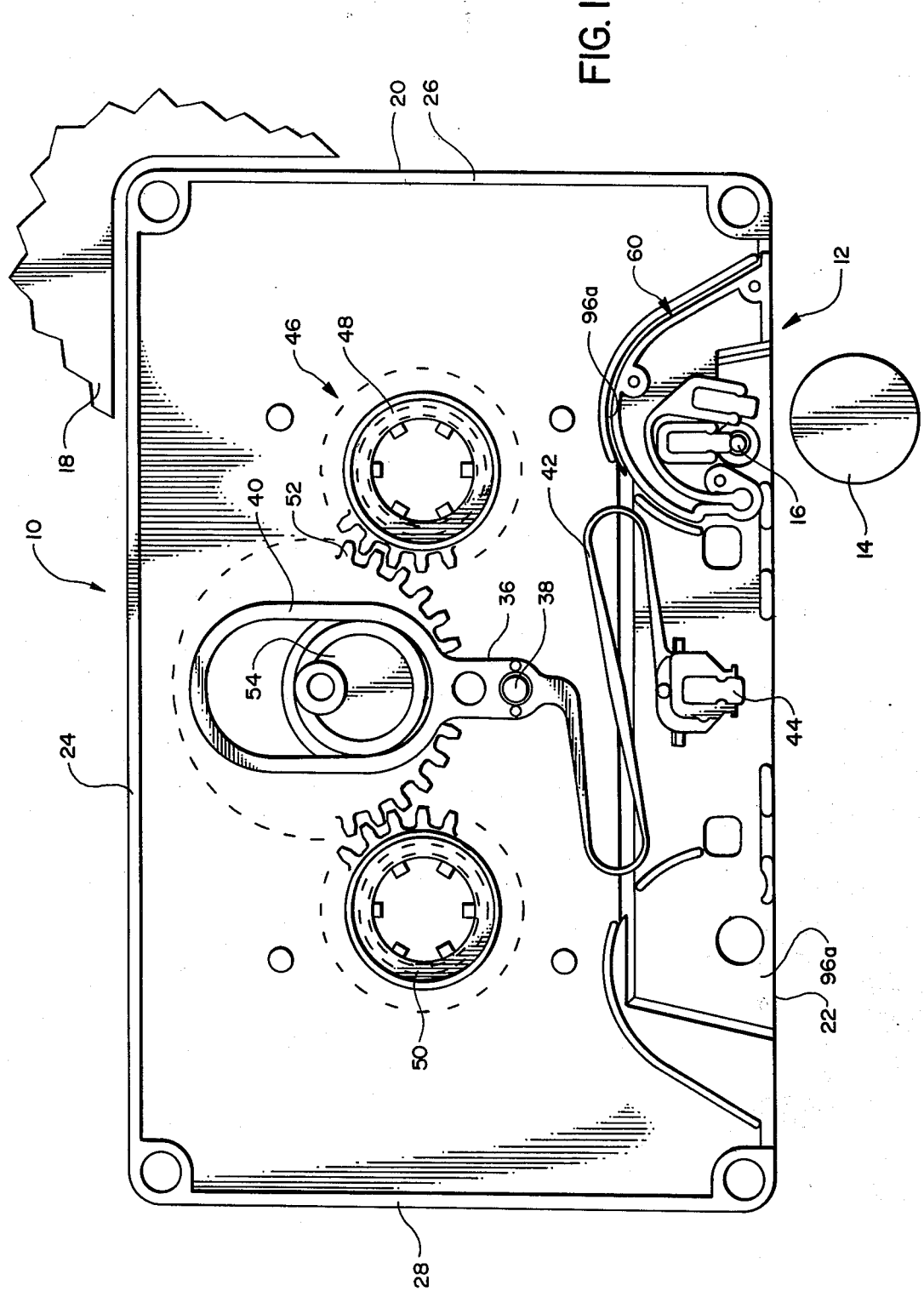
FIG. 1 is a top elevational view of a cassette cleaner adapted to utilize the cleaning assembly of the present invention.

FIG. 1 shows a cassette cleaner 10 adapted to utilize the cleaning assembly 12 of the present invention. Also shown are the pinch roller 14 and capstan 16 of a conventional player and/or recording unit, only a portion of which is shown at 18 for ease of illustration.

The cassette cleaner 10 is positioned in a recess of the unit 18, which recess normally receives a tape cassette to be used in the unit.

The cassette cleaner 10 comprises a cassette-like housing 20 having the same general configuration as a conventional cassette housing of a tape cassette. For purposes of illustration, the top cover of the housing 20 is not shown in FIG. 1. The housing 20 has a forward end 22, a rear end 24 and right and left sides 26 and 28, respectively. At the central portion of the housing 20, there is a wiper arm 36 pivotally mounted by a pin 38 to the housing 20. This arm 36 comprises a rear cam portion 40, an intermediate spring section 42 and a cleaning end having a cleaning pad 44 mounted thereon for cleaning a player/recording component of the unit 18.

To cause the arm 36 to oscillate about its pivot location 38, there is provided a drive mechanism 46. The mechanism 46 comprises right and left gears 48 and 50, each having a hollow center to engage a related right or left drive sprocket of the unit 18. Exterior teeth of the gears 48 and 50 mesh with a larger center gear 52 formed with an integral circular eccentrically mounted cam member 54. In operation, either the right or left gear 48 or 50 is driven by its related spindle to cause rotation of the center gear 52 with its cam 54 to cause the arm 36 to oscillate so as to clean the player/recording head of the unit 18.

Figure 2:
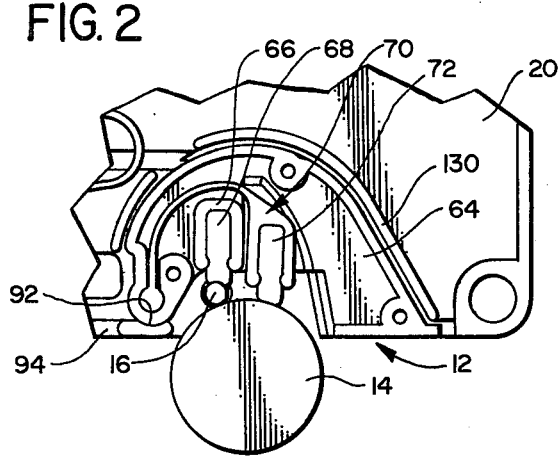
FIG. 2 is a view similar to FIG. 1, showing the cleaning assembly of the present invention engaging a capstan and a pinch roller of a player/recording unit.
Figure 3:
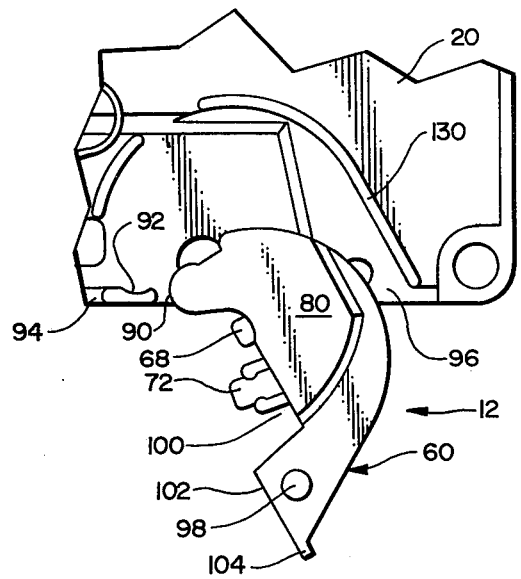
FIG. 3 is a view similar to FIG. 2, but showing the cleaning assembly of FIG. 2 being removed from the cassette cleaner.
Figure 4:
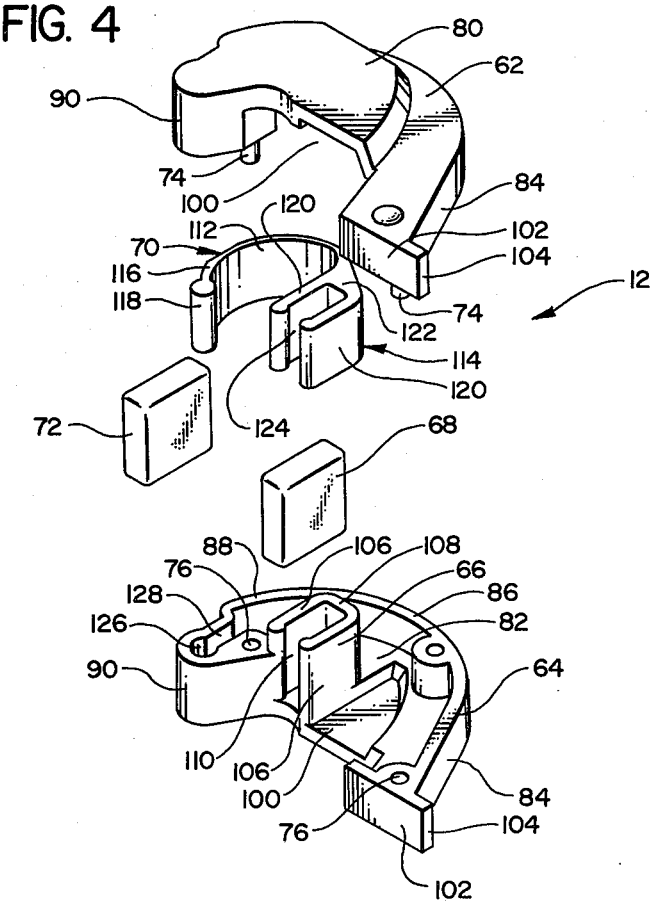
FIG. 4 is an exploded view showing the separate components of the cleaning assembly.

The cleaning assembly of the present invention will now be described with reference to FIGS. 2 through 4. However, before proceeding with such description, it should be pointed out that the capstan 16 normally rotates at a stationary location in the unit 18, while the pinch roller 14 has a first non-operating position (shown in FIG. 1) and a second operating position (shown in FIG. 2) where it moves rearwardly to engage the capstan 16.

The assembly 12 of the present invention comprises a housing 60 made up of upper and lower housing sections 62 and 64. In the lower housing section 64, there is a first pad mounting member 66 made integral with the lower section 64, and this member 66 is designed to receive a first cleaning pad 68 to engage the capstan 16. There is a second mounting member 70, arranged to hold a second cleaning pad 72 to engage the pinch roller 14.

The two housing sections 62 and 64 are formed with matching pins 74 and recesses 76 so that the two sections 62 and 64 can be easily connected to one another to form a unitary housing 60. The following description of the housing 60 will regard the two sections 62 and 64 as being fixedly connected one to another.

The housing 60 has a top wall 80, a bottom wall 82, and a mainside wall having a right hand portion 84, a rear portion 86 and a left hand portion 88, with these wall sections 84, 86 and 88 being contoured to form a substantially continuous curved wall. At the forward left hand portion of the housing 60, there is a continuation of the main side wall that is formed as a forwardly facing convexly curved bearing portion 90. This bearing portion 90 functions as a first connecting member which pivotally engages a matching curved recess 92 formed at a right edge portion of a front wall 94 of the housing structure 20 of the cleaner 10. To the right of the front wall 94, the cassette housing 20 is provided with a forward opening 96 through which the assembly 12 can be inserted into a cleaning position in the cassette housing 20.

At the forward right hand portion of the assembly housing 60, there is a small upwardly extending protrusion 98 which is adapted to snap into a matching detent (not shown in the drawing) in the top wall of the cassette housing 20. Also, there is a matching lower protrusion (not shown in the drawing) to engage a second matching detent in the lower wall of the cassette housing 20.

The forward side of the housing 60 is provided with a front opening 100, and there is a right front wall 102 located to the right of the opening 100. This front wall 102 extends moderately beyond the forward edge of the right side wall portion 84 to form a lip 104. As will be disclosed later herein, this lip 104 can be engaged to remove the assembly 12 from the cassette housing 20.

The first mounting member 66 comprises two vertical side walls 106 and a rear wall 108, with these walls 106 and 108 defining a "U" shaped recess 110. The first pad 64 slips snugly in the recess 110 and protrudes moderately forwardly therefrom to be positioned to engage the capstan 16.

The second pad mounting member 70 comprises a spring arm 112 and a mounting head 114. The arm 112 has a first anchor end 116, with a terminal enlargement 118 in the form of a rather narrow cylindrical shape. The mounting head 114 has a configuration similar to the mounting member 66 and comprises two side walls 120 and a rear wall 122, which walls 120 and 122 define a forwardly facing recess 124 to receive the second cleaning pad 72.

At the location of the pivotal bearing portion 90, the housing 60 is formed with a recess having a shape similar to the anchor end 116 of the spring arm 112. Thus, there is an enlarged generally cylindrical opening portion 126, connected to a rearwardly extending channel opening portion 128. Thus, the enlargement 118 fits in the opening portion 126, with the spring arm portion 116 extending rearwardly in the opening portion 128 and thence in a loop around the rear part of the first mounting member 66. The cassette housing 20 is formed with an interior wall 130 which is adjacent and generally matches the contour of the side wall 84-86, and it prevents the assembly 12 from being accidentally pressed to far into the cassette housing 20.

To describe the operation of the present invention, the assembly 12 normally remains mounted in the cassette housing 20 as shown in FIG. 1. In this arrangement the spring arm 112 bears against the first mounting member 66 so that the second cleaning pad 72 is positioned to the right of and moderately forward of the first pad 68. When the cleaning apparatus 10 is placed in the recess of the unit 18, the first pad 68 is already positioned in a manner that it immediately comes into contact with the capstan 16.

When the operating lever or button of the unit 18 is pressed, the pinch roller 14 moves rearwardly to press against the second pad 72 and actually move the pad 72 a short distance rearwardly so that the spring arm 112 presses the pad 72 against the pinch roller 14 with a moderate force. The rotation of the capstan and pinch roller (as caused by the operation of the unit 18) causes the outer surfaces of the capstan 16 and pinch roller 14 to wipe against the pads 68 and 72, respectively, to clean the surfaces of these components. A suitable liquid cleaning solution is usually applied to the two pads 68 and 72 prior to the cleaning operation.

After a number of cleaning operations, it is desirable that fresh pads be used in the cleaning operation. This is conveniently accomplished by the person inserting his or her fingernail against the rear side of the lip 104 and rotating the housing 60 in a clockwise direction (as seen in FIG. 3) so that the housing 60 pivots outwardly about the pivot location of the bearing portion 90. Then, the housing 60 can be moved free of the cassette housing 20. Desirably, the entire assembly 60 is made as a replaceable cartridge unit with the pads 68 and 72 already securely installed in their mounting members 66 and 70 respectively. This insures that the pads are properly positioned and snugly in place to optimize the cleaning operation. The new assembly can be reinstalled by engaging the bearing portion 90 against the surface 92 and then swinging the housing 62 counter-clockwise, as seen in FIG. 3, so that the connecting protuberance 98 snaps into engagement with the matching detent in the cassette housing 20.

Also, the cartridge 12 could be mounted in the left side of the cassette housing 20 which is formed with a second recess 96a substantially identical to the recess 96. Alternatively, there could be two cartridges, one in each recess 96 and 96a.

It is apparent that various modifications could be made to the present invention without departing from the basic teachings thereof.

What is claimed is:

1. A cleaning assembly adapted to be removably mounted in a cleaning position in a structure of a cleaning apparatus so as to be positioned to clean a capstan and pinch roller of a player and/or recording unit, said assembly comprising:
   (a) a housing having a forward portion, a rear portion, a first side portion and a second side portion,
   (b) said housing having at said first side portion a first connecting member adapted to engage a matching connecting means of said structure in pivoting relationship at a pivot connecting location,
   (c) said housing having at said second side portion a second connecting member adapted to engage a second connecting means of said structure when said housing is mounted in said structure in the cleaning position so as to inhibit rotation of the housing about the pivot connecting location, (d) a first pad mounting member fixedly mounted in said housing and defining a first forwardly extending recess to receive a first cleaning pad in a first pad cleaning position, (e) a second pad mounting member comprising a spring arm having a first anchor end held stationary in said housing and a second movable end, and a pad mounting head connected to the second movable end of the spring and providing a second forwardly extending recess to receive a second cleaning pad in a second movable pad cleaning position.

2. The assembly as recited in claim 1, wherein the first side portion of the housing is formed with an interior slot means to receive the anchor end of the spring arm, with the spring arm extending toward the second side portion of the housing at a location rearwardly of the first mounting member.

3. The assembly as recited in claim 2, wherein said spring arm is formed with an enlargement with fits in an enlarged portion of the slot means in the housing.

4. The assembly as recited in claim 3, wherein said enlarged portion of the slot means is positioned within said first connecting member.

5. The assembly as recited in claim 2, wherein said spring arm in a non-operating position bears against said first mounting member to limit movement of the mounting head in a forward direction, and permits rearward movement of said mounting head upon engagement of said pinch roller.

6. The assembly as recited in claim 1, wherein the second side portion of said housing has at a forward end thereof a laterally extending lip adapted to be grasped to cause rotation of said housing about said first connecting member.

7. The assembly as recited in claim 1, wherein:

(a) the first side portion of the housing is formed with an interior slot means to receive the anchor end of the spring arm, with the spring arm extending toward the second side portion of the housing at a location rearwardly of the first mounting member, (b) said spring arm is formed with an enlargement with fits in an enlarged portion of the slot means in the housing, (c) said enlarged portion of the slot means is positioned within said first connecting member, (d) said spring arm in a non-operating position bears against said first mounting member to limit movement of the mounting head in a forward direction, and permits rearward movement of said mounting head upon engagement of said pinch roller, (e) the second side portion of said housing has at aforward end thereof a laterally extending lip adapted to be grasped to cause rotation of said housing about said first connecting member.

* * * * *